United States Patent [19]

Vanderpool et al.

[11] Patent Number: 4,599,224
[45] Date of Patent: Jul. 8, 1986

[54] RECOVERY OF MOLYBDENUM FROM MOLYBDENUM DISULFIDE

[75] Inventors: Clarence D. Vanderpool; Martin B. MacInnis, both of Towanda, Pa.

[73] Assignee: GTE Products Corporation, Stamford, Conn.

[21] Appl. No.: 768,376

[22] Filed: Aug. 22, 1985

Related U.S. Application Data

[63] Continuation-in-part of Ser. No. 679,418, Dec. 7, 1984.

[51] Int. Cl.$^4$ .............................................. C01G 39/02
[52] U.S. Cl. ..................................... 423/606; 423/55; 423/61; 423/593; 544/181
[58] Field of Search ................... 423/61, 593, 55, 606; 544/181

[56] References Cited

U.S. PATENT DOCUMENTS

| | | | |
|---|---|---|---|
| 4,165,362 | 8/1979 | Reynolds | 423/53 |
| 4,217,292 | 8/1980 | Kroenke | 544/181 |
| 4,266,051 | 5/1981 | Kroenke | 544/181 |

OTHER PUBLICATIONS

Dresher et al., "Journal of Metals," Jun. 1956, pp. 794–800.

Primary Examiner—H. T. Carter
Attorney, Agent, or Firm—Donald R. Castle

[57] ABSTRACT

A process is disclosed for recovering molybdenum from molybdenum disulfide. The process involves forming a slurry of the molybdenum disulfide in a solution of an alkali metal hydroxide, the amount of hydroxide being sufficient to react with at least a portion of the molybdenum disulfide to form an alkali metal molybdate and an alkali sulfate, heating the slurry in an oxidizing atmosphere at an elevated temperature and pressure and for a sufficient time to effect the conversion to the molybdate, and separating the pregnant liquor containing the molybdate from any residue. To the pregnant liquor is then added a sufficient amount of a hexamine to form a hexamine-molybdenum compound containing the major portion of the molybdenum, followed by adjusting the pH to from about 1.5 to about 3.8 to precipitate the major portion of the hexamine-molybdenum compound, and separating the compound from the resulting mother liquor.

9 Claims, No Drawings

RECOVERY OF MOLYBDENUM FROM MOLYBDENUM DISULFIDE

This application is a continuation-in-part of Ser. No. 679,418 entitled "Recovery of Molybdenum From Molybdenum Disulfide", filed Dec. 7, 1984 and assigned to the same assignee as the present application.

FIELD OF THE INVENTION

This invention relates to a process for recovering molybdenum from molybdenum disulfide. More particularly, it relates to a process for recovering molybdenum from molybdenum disulfide by heating in an oxidizing atmosphere under pressure to produce alkali molybdate followed by precipitation of the molybdenum with hexammine.

BACKGROUND OF THE INVENTION

The most important starting material for molybdenum is molybdenite. It is usually found as a very low grade ore containing only a few tenths of a percent of molybdenum disulfide. The ores are processed by flotation, to a nearly pure molybdenum disulfide. The standard process for recovering molybdenum from the disulfide is by roasting in air in which the disulfide is oxidized to sulfur dioxide and the molybdenum is converted to molybdenum trioxide. The molybdenum trioxide is then sublimed to produce a pure grade material. Alternately, to produce molybdenum trioxide of lesser purity, the molybdenum trioxide can be acid washed to remove some impurities. After washing, the oxide can be reduced directly to molybdenum metal or further purified by being dissolved in ammonia, filtered to remove iron and insoluble hydroxides, then crystallized as pure ammonium paramolybdate or ammonium dimolybdate. The ammonium salts can be fired to molybdenum trioxide and finally reduced to the metal.

The main disadvantage of roasting is the production of sulfur dioxide which is one of the pollutants causing acid rain. Another disadvantage is that the temperature of roasting is critical since the molybdenum trioxide produced can either sublime or melt, both undesirable results. Another disadvantage is that the material must go through either a second firing to sublime the material for purification or through some type of acid washing. Both methods are time consuming and costly.

It would be desirable to recover molybdenum from molybdenum disulfide by a process which avoids these disadvantages.

SUMMARY OF THE INVENTION

In accordance with one aspect of this invention, there is provided a process for recovering molybdenum from molybdenum disulfide. The process involves forming a slurry of the molybdenum disulfide in a solution of an alkali metal hydroxide, the amount of hydroxide being sufficient to react with at least a portion of the molybdenum disulfide to form an alkali metal molybdate and an alkali sulfate, heating the slurry in an oxidizing atmosphere at an elevated temperature and pressure and for a sufficient time to effect the conversion to the molybdate, and separating the pregnant liquor containing the molybdate from any residue. To the pregnant liquor is then added a sufficient amount of a hexamine to form a hexamine-molybdenum compound containing the major portion of the molybdenum, followed by adjusting the pH to from about 1.5 to about 3.8 to precipitate the major portion of the hexamine-molybdenum compound, and separating the compound from the resulting mother liquor.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the present invention.

The molybdenum disulfide is preferably of a particle size of from about 0.5 to about 1 micron to allow for essentially complete reaction under the process conditions.

A slurry is formed of the molybdenum disulfide and an aqueous solution of an alkali metal hydroxide. The alkali metal hydroxide is preferably sodium hydroxide. The amount of alkali metal hydroxide is sufficient to react with at least a portion of the molybdenum disulfide to form an alkali metal molybdate and an alkali sulfate. With sodium hydroxide, generally from about 10.0% to about 100% in excess and preferably from about 10% to about 95% in excess of the theoretical hydroxide needed to convert essentially all of the molybdenum to the alkali metal molybdate is preferred.

The slurry is heated in standard pressure reactor in an oxidizing atmosphere at an elevated temperature and pressure and for a sufficient time to convert essentially all of the molybdenum disulfide to the alkali molybdate. Preferred process conditions with sodium hydroxide are from about 75 to about 150 PSIG, preferably from about 100 PSIG to about 150 PSIG of oxygen pressure; from about 80° C. to about 125° C., preferably from about 95° C. to about 105° C.; and from about 4 hours to about 12 hours, and preferably from about 2 hours to about 6 hours.

With sodium hydroxide, at least about 60 weight percent of the molybdenum is converted to sodium molybdate.

As a result of the reaction, a pregnant liquor containing at least a portion of the molybdenum as molybdate and containing an alkali sulfate is produced, along with a solid residue. The liquor is separated from the residue by any standard technique such as filtration.

A sufficient amount of a hexamine, in particular hexamethylenetetramine is then added to the pregnant liquor to form a hexamine-molybdenum compound containing the major portion of the molybdenum which is in the pregnant liquor. It has been found that typically about a 1 to 1 weight ratio of the hexamine to molybdenum results in the subsequent precipitation of essentially all of the molybdenum; although this ratio can vary.

The pH of the resulting hexamine-treated pregnant liquor is then adjusted to from about 1.5 to about 3.8 and preferably to about 2.6 with an acid preferably sulfuric acid to precipitate the major portion of the hexamine-molybdenum compound. PH values greater than about 3.8 result in lesser yields of the compound.

The hexamine-molybdenum compound is then separated from the resulting mother liquor by any standard technique such as filtration.

At this point, to further purify the molybdenum, the hexamine-molybdenum compound can be dissolved in sufficient ammonium hydroxide to solubilize the compound. Preferably the ammonium hydroxide is at a pH of about 9.0. The resulting ammoniacal molybdate solution is adjusted to a pH of from about 1.5 to about 3.8, and preferably about 2.6 with an acid, preferably sulfuric acid to reprecipitate the hexamine molybdenum compound. The ammonium hydroxide dissolution, pH adjustment, and reprecipitation steps can be carried out any number of times depending on the purity which is desired.

The hexamine molybdenum compound is heated in air at a sufficient temperature for a sufficient time to decompose the hexamine-molybdenum compound and form molybdenum trioxide. Generally the heating temperatures are from about 400° C. to about 550° C. with about 550° C. being preferred. The temperature is preferably no higher than about 550° C. because the molybdenum trioxide sublimes above this temperature.

The molybdenum trioxide can be processed by standard methods to obtain desired products, such as reduction to obtain molybdenum metal.

To more fully illustrate this invention, the following non-limiting example is presented. All parts, portions, and percentages are on a weight basis unless otherwise stated.

About 100 parts of molybdenum disulfide is ball milled to about 0.8 microns in particle size. It is then slurried in a solution of about 150 parts of sodium hydroxide and about 150 parts of water. The slurry is then placed in a pressure vessel under about 100 pounds of oxygen pressure and heated at about 93° C. for about 10 hours. After the heating period, the resulting mixture is filtered to remove the insolubles. About 98% of the starting molybdenum is recovered in the solution as sodium molybdate. After the filtering step, to remove iron and other impurities about 70 parts of hexamethylene tetramine is added to the molybdate solution and the pH is adjusted to about 2.6 with sulfuric acid which has been diluted with water to give about 1 part of acid to about 3 parts of water. The resulting precipitate of hexamine-molybdenum is filtered and redissolved in ammonium hydroxide at a pH of about 9.0. The resulting ammoniacal molybdenum solution is adjusted to a pH of about 2.6 with sulfuric acid which has been diluted as described above to reprecipitate the hexamine-molybdenum compound. The compound is then heated in air at about 550° C. to produce relatively pure molybdenum trioxide.

The following Table shows the analyses of a starting molybdenum disulfide material and the final molybdenum trioxide produced by the process of this invention. It can be seen that the product is essentially pure with respect to the starting material.

TABLE

| Impurity | ppm MOS$_2$ Starting Material | MoO$_3$ Product |
| --- | --- | --- |
| Ag | 5–50 | Not detected |
| Al | 50–5000 | 1–10 |
| B | 1–10 | Not detected |
| Bi | 5–50 | Not detected |
| Ca | 10,000–100,000 | 5–50 |
| Co | 10–100 | Not detected |
| Cr | 50–500 | Not detected |
| Cu | 1000–10,000 | 1–10 |
| Fe | 5000–50,000 | 10–100 |
| Mg | 500–5000 | 0.5–5 |
| Mn | 5–50 | 1–10 |
| Ni | 10–100 | Not detected |
| Pb | 100–1000 | Not detected |

TABLE-continued

| Impurity | ppm MOS$_2$ Starting Material | MoO$_3$ Product |
| --- | --- | --- |
| Si | 10,000–100,000 | 10–100 |
| Sn | 5–50 | Not detected |
| Sr | 5–50 | 5–50 |
| Ti | 1000–10,000 | Not detected |
| V | 5–50 | Not detected |

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering molybdenum from molybdenum disulfide, said process comprising:
   (a) forming a slurry of said molybdenum disulfide in a solution of an alkali metal hydroxide, the amount of alkali metal hydroxide being sufficient to react with at least a portion of the molybdenum disulfide to form an alkali metal molybdate and an alkali sulfate;
   (b) heating said slurry in an oxidizing atmosphere at an elevated temperature and pressure and for a sufficient time to convert at least a portion of the molybdenum disulfide to the alkali metal molybdate and provide a pregnant liquor of the alkali metal molybdate and a residue;
   (c) separating said pregnant liquor from the residue;
   (d) adding a sufficient amount of a hexamine to said pregnant liquor to form an hexamine-molybdenum compound containing the major portion of the molybdenum which is in said pregnant liquor;
   (e) adjusting the pH of the resulting hexamine-treated pregnant liquor to from about 1.5 to about 3.8 to precipitate the major portion of said hexamine-molybdenum compound; and
   (f) separating said hexamine-molybdenum compound from the resulting mother liquor.

2. A process according to claim 1 wherein the oxidizing atmosphere is oxygen.

3. A process according to claim 1 wherein the heating temperature is from about 90° C. to about 100° C.

4. A process according to claim 1 wherein the pressure is from about 100 PSIG to about 150 PSIG.

5. A process according to claim 1 wherein the heating time is from about 4 hours to about 12 hours.

6. A process according to claim 1 wherein the alkali metal hydroxide is sodium hydroxide in an amount of from about 10% to about 100% of the theoretical needed to convert essentially all of the molybdenum disulfide to the alkali molybdate and the alkali sulfate.

7. A process according to claim 1 wherein at least about 60 weight percent of the molybdenum in the molybdenum disulfide is converted to the alkali molybdate.

8. A process according to claim 1 wherein said hexamine-molybdenum compound is heated at a sufficient temperature for a sufficient time to form molybdenum trioxide.

9. A process according to claim 1 wherein said hexamine-molybdenum compound is purified by dissolving said hexamine-molybdenum compound in ammonium hydroxide followed by adjusting the pH of the resulting ammoniacal hexamine-molybdenum solution to from about 1.5 to about 3.8 to reprecipitate said hexamine-molybdenum compound.

* * * * *